Oct. 8, 1929.  F. W. SIEGEL  1,731,113
ROD SUPPORTING MEANS
Filed July 16, 1928
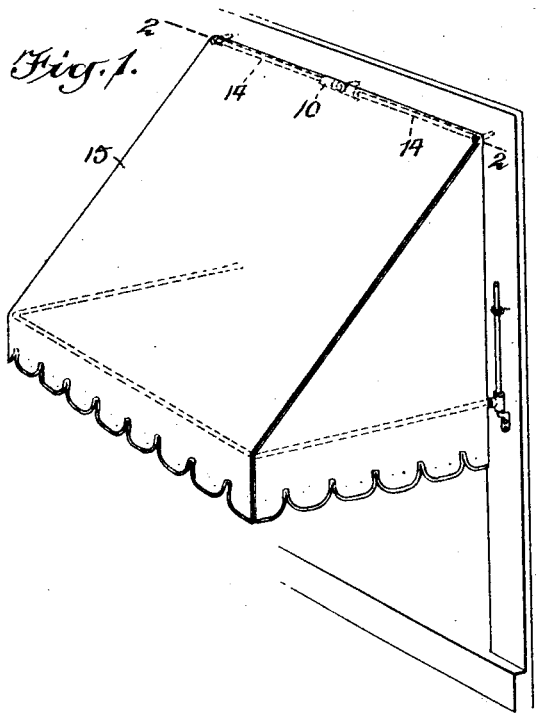
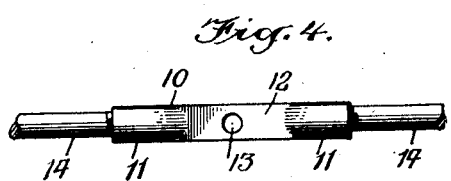
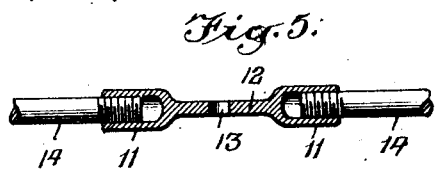
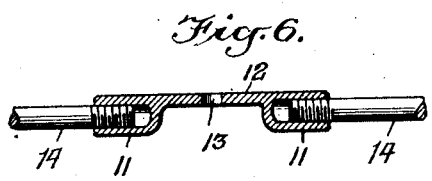
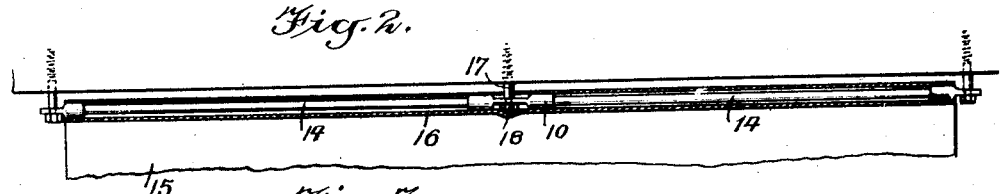
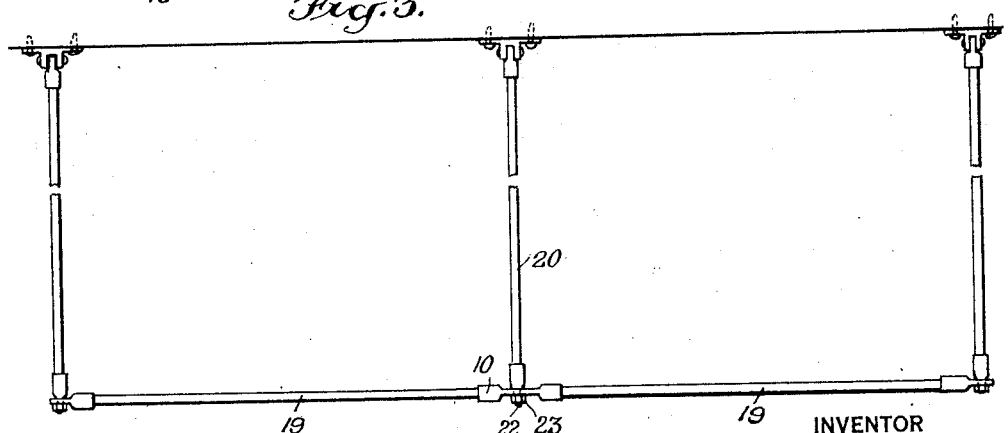
WITNESSES
INVENTOR
F. W. Siegel
BY
ATTORNEY Patented Oct. 8, 1929

1,731,113

UNITED STATES PATENT OFFICE

FRED W. SIEGEL, OF NEWARK, NEW JERSEY

ROD-SUPPORTING MEANS

Application filed July 16, 1928. Serial No. 292,937.

This invention relates to means for connecting together and supporting components of divers appurtenances, such for instance, as the rod sections of awnings and canopies.

The principal object of the invention is the provision of means of the indicated character of simple and novel construction, which may be readily put into effective use for the intended purposes.

The new and distinguishing features and advantages of the invention will appear from the embodiment of the invention, which by way of example is described in the following specification, and illustrated in the accompanying drawing, in which—

Figure 1 illustrates an awning, the head rod of which is supported by the means employed in accordance with the present invention.

Fig. 2 is a sectional view taken on the line 2—2 of Fig. 1.

Fig. 3 is a view illustrating the front rod of an awning supported by the means employed in accordance with the invention.

Fig. 4 is an enlarged elevation of the connecting means.

Fig. 5 is a longitudinal sectional view of the connecting means.

Fig. 6 is a longitudinal sectional view of a modified form of connecting means.

The present invention contemplates the provision of a device in the form of a union for the purpose of connecting together the sections of an unusually long rod, together with fastening means which serves in conjunction with the union for the purpose of rigidly supporting the rod to prevent the same from sagging.

The union 10 which is best seen in Figs. 4, 5 and 6, consists of threaded sockets 11, connected together by an integral, substantially short flat shank 12 having a hole 13. The shank 12 may be centrally disposed in axial alignment with the sockets 11 as shown most clearly in Fig. 5, or the shank may be disposed at one side of the axial plane of the socket 11, as shown most clearly in Fig. 6.

Fig. 2 exemplifies the use of the union 10 and fastening means in conjunction with the sections 14 of the head rod of an awning 15, it being understood that the rod extends through a hem designated 16 at the top of the awning. The sockets 11 respectively receive threaded ends of the rod sections 14 for the purpose of connecting them together. Suitable fastening means is employed in conjunction with the union 10, and as shown in Fig. 2 consists of a stud bolt 17 one end of which is screwed into a suitable socket in the building structure, and the opposite end is received in the hole 13, with a nut 18 applied thereto to rigidly hold the union in supported position. In this manner an unusually long head rod may be supported to prevent the rod from sagging at the middle.

Fig. 3 illustrates the sections 19 of a front awning rod supported for the purpose of preventing the same from sagging at the middle. In this case the union 10 is connected between the rod sections 19, and an intermediate rod 20 has its outer end connected with the shank 12, by the use of a socket 21 attached to the outer end of the rod 20, the said socket 21 having a threaded stud 22 which is extended through the hole 13 in the shank 12, and a nut 23 is applied to the stud 22.

It is to be understood that the sockets 11 of the union respectively may be provided with right and left threads, or threaded in any other manner to suit different conditions; that the sockets 11 may be of various sizes to fit different size rod or pipe ends; and that the shank 12 may be of any desired length.

I claim:

1. A union consisting of rod end receiving sockets, and a shank connecting the sockets together, said shank being so formed as to accommodate fastening means for the purpose of rigidly securing the union.

2. A union consisting of threaded rod and receiving sockets, and a shank rigidly connecting the sockets together in alinement, said shank having a hole therein, to receive a fastening element, for the purpose of rigidly securing the union.

3. The combination with parts of an awning rod, of separate means connecting the parts together in alinement with each other, a relatively fixed support, and separate means rigidly connecting the means first mentioned with said support, for the purpose of supporting said rod.

FRED W. SIEGEL.

CERTIFICATE OF CORRECTION.

Patent No. 1,731,113.                    Granted October 8, 1929, to

FRED W. SIEGEL.

It is hereby certified that error appears in the printed specification of the above numbered patent requiring correction as follows: Page 1, line 93, claim 2, for the word "and" read "end"; and that the said Letters Patent should be read with this correction therein that the same may conform to the record of the case in the Patent Office.

Signed and sealed this 12th day of November, A. D. 1929.

(Seal)

M. J. Moore,
Acting Commissioner of Patents.